United States Patent [19]

Herren

[11] Patent Number: 4,836,361
[45] Date of Patent: Jun. 6, 1989

[54] REPLACEABLE DEVICE FOR OUTER SPOKE EDGE OF PULLEY WHEEL

[76] Inventor: Harold L. Herren, 802 Main St., Platteville, Colo. 80651

[21] Appl. No.: 704,717

[22] Filed: Feb. 25, 1985

[51] Int. Cl.⁴ .............................................. B65G 39/10
[52] U.S. Cl. ..................................... 198/843; 474/185
[58] Field of Search ............... 198/843, 835, 834, 842, 198/494; 474/185, 191, 92, 188

[56] References Cited

U.S. PATENT DOCUMENTS

| | | | |
|---|---|---|---|
| 1,691,993 | 11/1928 | Rogers | 474/185 |
| 3,046,805 | 7/1962 | Van Gorp | 474/185 |
| 3,220,272 | 11/1965 | Beausoleil | 474/191 |
| 3,363,476 | 1/1968 | Brown | 474/191 |
| 3,789,682 | 2/1974 | Holz | 474/185 |
| 4,464,149 | 8/1984 | Klyn | 474/185 |

Primary Examiner—Robert J. Spar
Assistant Examiner—D. Glenn Dayoan
Attorney, Agent, or Firm—Dean P. Edmundson

[57] ABSTRACT

This invention relates to a replaceable repair device for use to repair the outer terminal edge of a flat spoke of a wing pulley wheel, in general, and more specifically: to a cross-sectionally T-shaped elongated repair device having a top cross-bar, and a lower parallel pair of spaced apart downwardly extending flat legs secured to the cross-bar underside and with the legs adapted for overlapping abutment relation with and secured to the outer surface sides of a flat spoke adjacent the spoke terminal edge, and to the cross-bar of the T-device a metal base plate, having a rubber strip vulcanized thereon, with the metal base plate replaceably tack-welded at interval spots to the cross-bar of the T unit, and by the interval tack-weld spots thereby to avoid welding heat loosening the rubber vulcanization on its metal base plate.

5 Claims, 2 Drawing Sheets

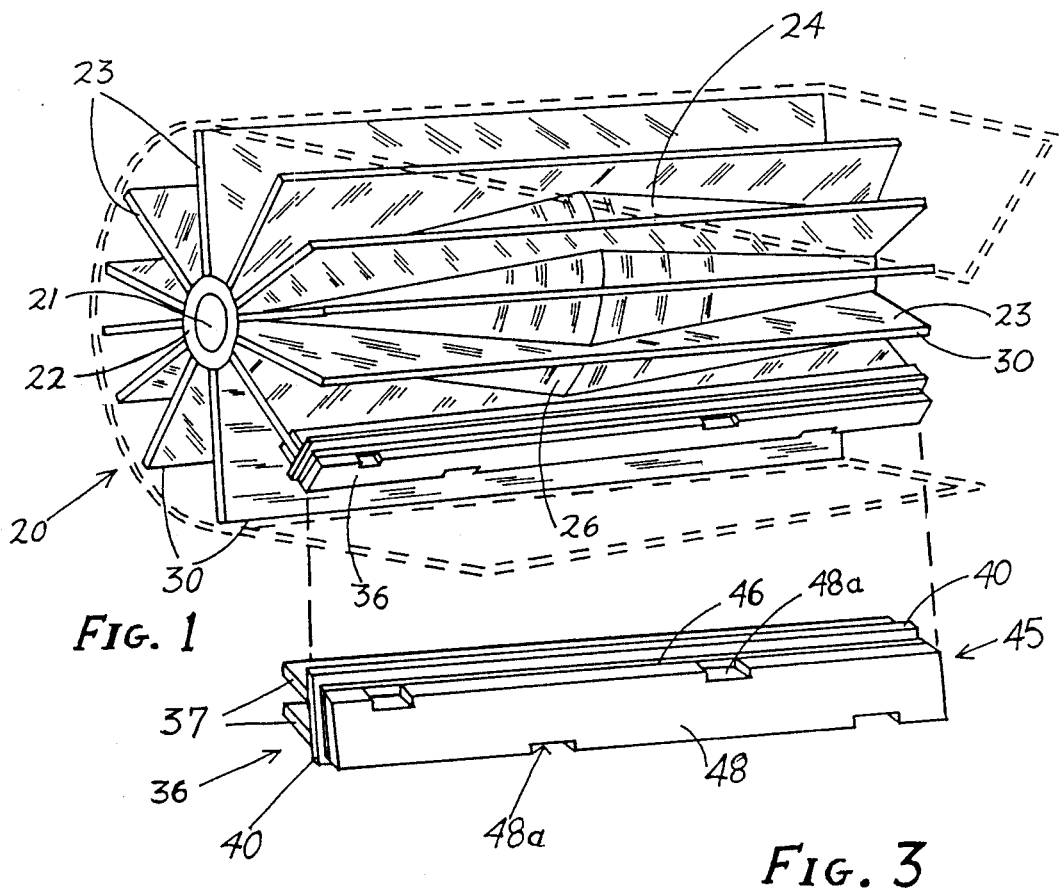
FIG. 1
FIG. 3
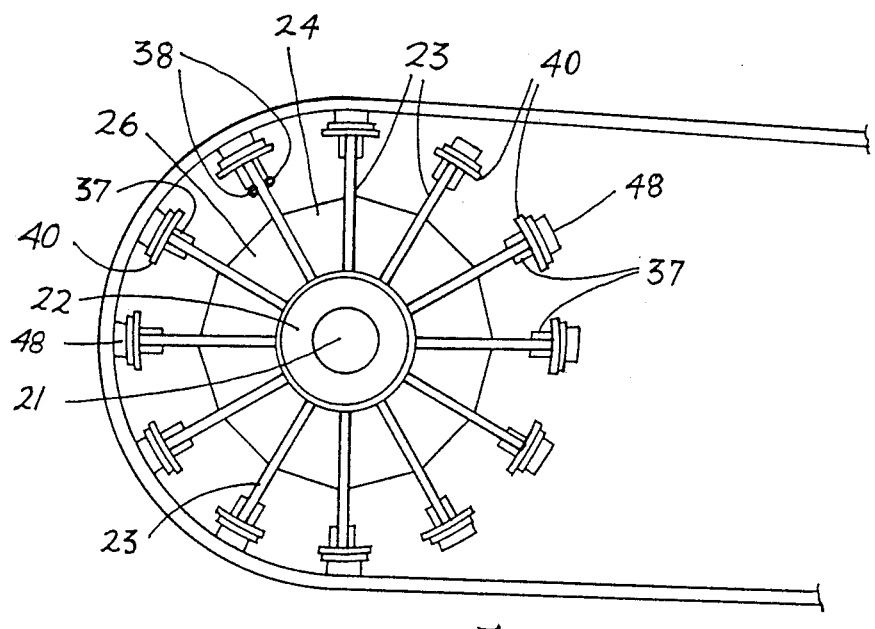
FIG. 2

REPLACEABLE DEVICE FOR OUTER SPOKE EDGE OF PULLEY WHEEL

BACKGROUND OF THE INVENTION

This invention pertains to wing pulleys, commonly used with large conveyors to transport heavy materials, such as gravel. Wing pulleys used in connection with the conveyors belts are usually provided with high friction surfaces for increased traction between the pulley and the belt. Those surfaces are usually strips or pads of rubber, secured by various methods to the outer edge of the flat spokes of the pulley wheel. Such pads become worn and have to be replaced. Further, in the process of use of the conveyor, carrying such heavy material, the individual flat spokes of the pulley wheel become bent at their outer edges, and those edges become worn, and the problem presents itself then of how to repair said terminal outer edges of the spokes. Various problems have then arisen relative to said pulley wheels.

One problem is how to secure the rubber onto the outer edge of the wheel spokes, which rubber is usually secured by gluing or vulcanizing, which requires a dismantling of the conveyor and the pulley wheels, in order to accomplish such vulcanizing to the worn outer edges of the spokes of the wheel. Such is a time-consuming, difficult and expensive task. This invention solves that problem by vulcanizing the rubber pad onto a single flat metal base plate. This invention provides for such piece of a rubber strip and its plate to be made of considerable combined length pieces, and then cut to any desired length when the need arises to replace a rubber pad to the outer terminal edge of the flat wheel spoke. The repair kit of this invention also provides a novel elongated replaceable T-cross-sectionally rigid metal strip, with said T-cross-sectional strip comprising: an upper cross bar surface, and a pair of spaced apart downwardly extending parallel legs as the leg of the T; with said spaced apart pair of legs being adapted to rest on and over the outer terminal edge of the flat wheel spoke, to support the outer edge during wheel use. The top cross bar of the T member is adapted to carry the metal base part of the rubber strip, by a spot welding of that base part thereto, as the most effective way to hold that rubber pad for use onto the cross bar of that T member. The rubber strip is vulcanized onto its metal part base plate.

The other problem arising is how to prevent a loosening of the rubber, vulcanized to its metal base plate, as a result of the heat from the spot welding of that strip metal base plate onto the cross bar of the T. This invention also solves that problem, by providing a novel method of only spot-welding the metal base strip of the rubber at a relatively few spaced apart places to the upper cross bar of the T member. Such eliminates considerable of the heat from that welding from reaching the entire vulcanized surface of the rubber strip onto its metal base plate, and thus preventing the rubber strip from becoming loosened as a result.

Thus, the provision of a pulley spoke repair lagging replaceable device, to which the rubber cushion pad is uniquely secured, and with that device as an elongated cross-sectional rigid T-member adapted to rest on and over the outer terminal edge of the flat spoke of the wheel, with the device having a pair of spaced apart parallel rigid legs adapted to support the outer surfaces of that pulley spoke, are included in the basis for this Application. By this novel repair device, needed repairs to the pulley wheel can be made in place, without having to dismantle the conveyor.

RELATED PRIOR ART

A careful preliminary search relative to this invention was made by a competent Searcher, resulting in the following U.S. references being found in Class 474, Subclasses 185 and 191:
 #4,464,149 Edward D. Klyn, a different structure;
 #3,392,594 F. VanGorp, a different structure;
 #3,363,476 B. H. Brown, a different structure and method; and
 #3,046,805 F. VanGorp, entirely different.
The foregoing references do not have any disclosure or teaching by way of anticipation of the invention of this Application.

SUMMARY OF THE INVENTION

This invention provides a single novel repair device to repair the outer deformed worn terminal edges of flat spokes of a conveyor pulley wheel, and accomplishes several results. There has been an insufficient way to strengthen the terminal outer edges of the flat spokes of a pulley wheel, where the belt conveyor thereon carries heavy material. The terminal ends of such flat wheel spokes usually become bent and deformed, as a result of the weight of the material carried by the conveyor belt. This Application has a novel cross-sectional T-shaped metal elongated rigid member adapted to be replaceably inserted over the outer edge of the worn spoke. The T-cross-sectional member has an upper flat surface and a downward aligned pair of parallel spaced apart rigid legs, acting as the leg of the cross-sectional T, and with said legs adapted to snugly embrace and support both outer upper flat sides of the spoke surface adjacent the spoke terminal edge, acting to prevent wear and deformity of the outer flat spoke edge. The parallel spaced legs of the cross-sectional T member are adapted to abut and reinforce the sides of the flat spoke adjacent its terminal edge, to which applied, and thus to prevent it from bending. The upper cross-bar of the T repair device has a replaceable rubber metal-base-plate strip, replaceably secured thereto by a novel spot-welding securement method to that T-cross-bar. The rubber pad strip usually ½ inch thick by ¼ inches wide is suitably vulcanized to its metal base plate strip. Then a staggered welding method is used to secure the rubber, by its metal base strip to that upper cross-bar of the T device, has been developed. To prevent substantial loosening of the rubber from its metal base plate strip, a tack-welding of that metal strip to the T-cross-bar is applied only at spaced interval places. When the T-device repair member 36, with its parallel spaced apart downward extending legs 37, is placed over the flat spoke outer terminal worn spoke edge, those legs re adapted to fit snugly against the sides of that flat spoke, and then those legs are also spot-tack welded at spaced intervals to the side surfaces of that flat spoke. To help prevent that tack-welding heat from damaging the rubber vulcanized affixation, of the rubber to its metal base plate 46 strip, I spacedly notch-out adjacent places of the rubber 48, at spaced interval spots, indicated as 48a, at such welding spots. When pulley use causes the rubber 48 to wear down, and the rubber needs to be replaced, the said tack-weld spots 50, which secured the rubber base plate 46 to the cross-bar 40 of the T-device, can be acetyln torch loosened and removed, or otherwise those welded spots 50 are suitably removed as by use of a blowout carbon arc, without loosening the lower legs 37 on spoke 23, and then a new 48 rubber with its baseplate 46 is installed.

An object of the invention is the provision of a Pulley Flat Spoke Repair Kit, providing a novel elongated rigid T-shaped device to strengthen the worn uneven misshapen outer edge of the wing wheel flat spoke by a replacement T-cross-sectionally-shaped member, having the leg of the T formed as a pair of spaced apart parallel legs rigidly secured to the upper cross bar of the T device, and with those legs adapted to abut and to be removably secured to each side of the outer surface of a flat spoke of the wheel adjacent the spoke terminal edge, with a removable replaceably affixed rubber strip on a metal-base portion, and with that metal-base rubber also removably tack-welded to the cross bar of the T of the device.

BRIEF DESCRIPTION OF THE DRAWINGS

FIG. 1 is a perspective partial view of the pulley wheel of a conveyor, having my repair device on one spoke;

FIG. 2 is a partial end view of the wheel of FIG. 1, having my repair device on the outer edge of each spoke;

FIG. 3 is a perspective view of my novel repair unit device;

DESCRIPTION OF THE PREFERRED EMBODIMENT

Figure 4:
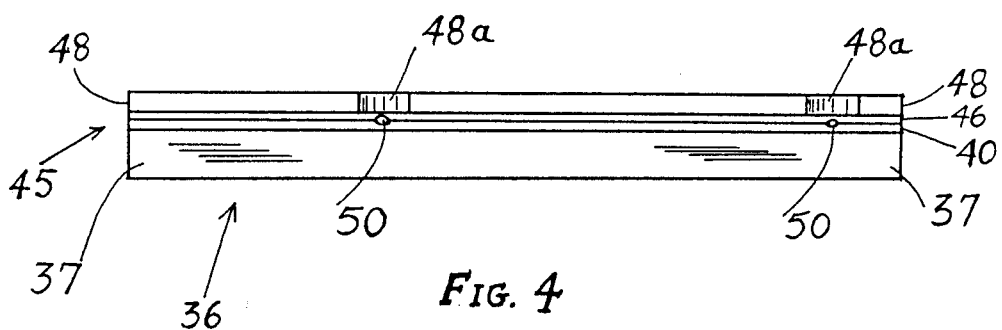
FIG. 4 is a vertical side view of the device of FIG. 3.
Figure 5:
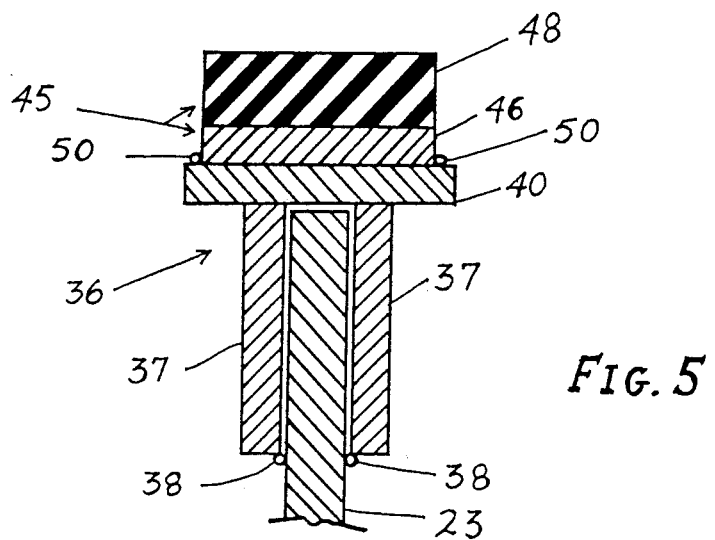
FIG. 5 is an enlarged end view of my T-shaped repair device.

FIG. 1 shows, generally, diagrammatically, the end of a conveyor belt on a pulley wheel at that end, which wheel is the subject of this invention, having Applicant's novel repair T-cross-sectionally shaped member on one or more of the terminal edges of the flat spokes of that wheel.

The pulley of this invention is indicated generally as 20 of FIG. 1, comprising a hub 21 on bushings 22 (only partially shown at one end). A plurality of flat spokes or wings 23 are secured as by welding lengthwise along their one sides to the hub 21 in a radially spaced manner, and the wheel has stabilizing spoke truncated gusset plates, 24 and 26, secured, of the design and manner shown, between adjacent pairs of the spokes conventionally, as by welding of 24 and 26 to the sides of the adjacent pair of spokes.

Over each unevenly worn-out outer edges of the spokes 23, of the pulley wheel (which worn-out condition occurs after heavy pulley conveyancing use, such as in the industry where belt conveyors carry heavy gravel thereon) which have become worn and uneven and also laterally bent, the repair device of this invention is placed and slipped on and over the terminal edge 30 of such one of a flat spoke. One of such elongated T-cross-sectionally shaped repair kit members is shown as 36. Such use of this repair kit 36 is placed on a spoke without having to dismantle the conveyor belt and that pulley wheel, and after having made any lateral needed straightening of the bent and terminal worn edge of the particular spoke wheel. Tack-spot welding of the lower edges of the bifurcated parallel spaced apart lower legs 37, of the T-member 36, to its adjacent flat spoke sides at several spaced apart 38 places, is applied at the lower edges of the spaced parallel legs 37 as shown, on each spoke.

Figure 6:
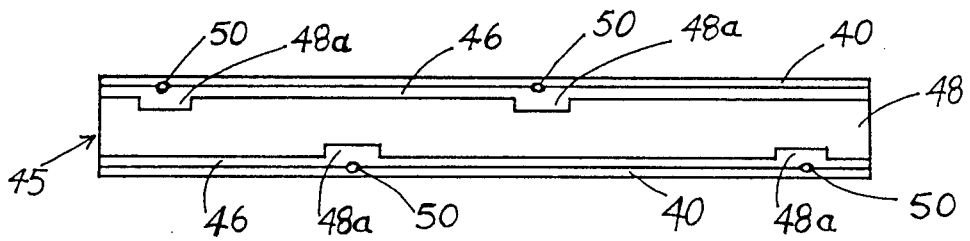
FIG. 6 is a plan view of the rubber-metal-base strip of my device, and as secured onto its metal base plate and showing the rubber notches adjacent spot tack places where the rubber-metal-base is tack-welded to upper cross plate of the device T-surface.

The novel T-shaped pulley wheel repair kit of this invention, being the T-shaped elongated metal member indicated generally as 36, has upper cross-plate 40 and the bifurcated parallel spaced apart rigid metal legs 37 extending downwardly from that upper cross plate of the T-member. Member 36 is adapted to have a close-fitting of its legs 37 over and along the sides and against those outer upper surface sides of a 23 spoke to which attached. This T-shaped device 36 with its parallel T-legs 37 laterally support that spoke from conveyor operation weight pressure causing the upper terminal edge ends 23a of that spoke to bend. Such bending occurs without this novel T-shaped supporting member 36 thereon. Parallel T-legs 37 are usually of $\frac{1}{4}$ inch $\times$ 1 inch steel. Cross plate 40, of the cross-sectional T-repair member 36, is usually $\frac{1}{4}$ inch $\times \frac{1}{2}$ inch steel, and is welded onto the parallel lower spaced apart legs pair 37a, as shown. On upper cross-flat-plate 40, of the T, is replaceably secured a metal-based-rubber strip member, indicated generally as 45, comprising a metal base member 46 preferably of $\frac{1}{4}$ inch $\times 1\frac{3}{4}$ inch steel material, and with a $\frac{1}{2} \times 1\frac{1}{4}$ inch wide rubber strip 48 vulcanized onto that plate 46, as shown in FIG. 6. This invention uses the novel method of tack-weld-securing the metal base plate 46 of rubber member 45 onto the cross plate 40, of the T repair member 36, namely, by spot or tack-welding the plate 46 to the cross bar 40 only at spaced interval spots, with those intervals indicated as tack-spots 50. Heat from that welding would loosen the vulcanized securement of the rubber pad 45, which is rubber vulcanized to its base plate 46, and that loosening would be fatal to the operation of the pulley conveyor wheel 20, in the form of the rubber becoming loosened therefrom and lost, were it not providing for prevention of that loosening of the rubber from its 46 base plate by this invention using the novel method of only spot-welding of the metal base 46 of the rubber member 45 to the cross plate 40 of the T-member at only a few spaced apart spot-weld places 50. Such method of only a few spot-weld places of plate 46 onto cross bar 40 substantially reduces most of the heat from the welding at those spots from reaching the adjacent rubber vulcanized seating of the rubber 48 onto its base plate 46. Metal base plate 46 is necessarily vulcanized to rubber 48 to support and secure the rubber pad strip 48 on T-member 36, in turn on the wheel spoke 23, to assure the continued affixation of that rubber 48 to the spoke. This invention utilizes that new method of assuring the rubber pad will remain fastened onto its base plate 46, by only sparingly spot-welding the metal rubber base-plate 46 to the upper cross bar 40 of the T device, as will be explained.

FIG. 6 illustrates how the rubber strip 48 is secured onto its metal base plate 46, by first making the necessary cut-out pocket indentations of 48 at adjacent spot-weld places where the plate 46 is tack-welded onto the cross bar 40 of the T-device, as shown. The rubber is cut away at 48a a distance from those adjacent individual spot-weld spots, indicated as 50, to assure that most of the heat from the spot-weld at those spot-weld 50 places does not reach rubber 48, to prevent heat contact with the lower vulcanized area of the rubber seated onto its base plate 46, as illustrated.

Since many changes and modifications may be made in the preferred embodiment of this invention, it is to be understood that any such changes will not deviate from the teaching, spirit, scope and definition of this invention as I wish to be bound only as defined in the hereunto appended claims.

What I claim and desire to be secured by Letters Patent is:

1. A replaceable repair device for the terminal edge of the flat spoke of a pulley wheel comprising:

a T-cross-sectional elongated rigid bracket member adapted for securement to said terminal edge, said wheel being cylindrical about an elongated axis of rotation, said bracket member having an upper cross bar surface portion and a bifurcated downward extending spaced apart parallel pair of T-legs with the T-leg pair secured centrally under and to the cross-bar-portion normal to said cross-bar and adapted to be placed over and closely abut the outer sides of a flat spoke adjacent the spoke terminal edge;

means for replaceably securing the mounting bracket to said spoke including said parallel spaced-apart pair of the T-legs adapted to closely overlap and abut the sides of the flat spoke on which said bracket member is placed adjacent the spoke terminal edge; and a rubber friction strip pad replaceably attached to said T-member-cross-bar upper surface portion and disposed outwardly therefrom, whereby substantially complete wear of the thickness of the friction strip is allowed before the rubber strip must be replaced;

and means for replaceably attaching the rubber strip pad to said cross-bar of the bracket member.

2. The replaceable repair device of claim 1, wherein the pair of T-legs are replaceably secured to said pulley spoke sides at and by spaced-apart spot-tack-weldment places, with said replaceable weldment spot places being capable of torch burnable release to permit a removal of the entire T-cross-sectional elongated mounting bracket member from that terminal outer edge of the spoke.

3. The replaceable repair device of claim 1, wherein the means for securing the rubber strip pad to the cross-bar includes a metal base plate to which the rubber strip is vulcanizingly secured, and said base plate is replaceably spaced-apart tack-on spot welded onto the cross-bar of the T-bracket, and with said spot-tack-on weldment of the base plate being adaptable to be acetyln torch burnable for release of the base plate with its rubber strip, and wherein the rubber strip pad is partially recessed away a distance at its sides at adjacent places of said spot-weldment places of the metal base plate of the rubber strip in spot-weldment to said T-cross-bar upper surface portion.

4. An elongated T-cross-sectional repair device adapted to repair the terminal edge of a flat spoke of a pulley wheel, wherein the T-device comprises an upper surface cross-bar and a pair of right angular spaced apart parallel legs secured to the underside of the cross-bar, said legs being adapted to abut the flat spoke sides of and upon the device being secured onto and over a terminal spoke edge, and a rubber strip means removably secured to said cross-bar.

5. A friction strip member, adapted to be replaceably plural spot-track-weldment secured to the terminal flat peripheral portion of the spoke of a pulley wheel, comprising (a) a flat metal supporting member, and (b) a rubber strip member vulcanizedly secured to the supporting member, said rubber strip member having plural recessed spaced-apart notches formed in its edges adapting each of said notches for permitting an adjacent spot-weldment securement of the supporting member to said terminal spoke portion without direct heat weldment contact to the rubber strip.

* * * * *